Sept. 6, 1949.  W. L. BARROW ET AL  2,480,829
RADIO DIRECTION INDICATING APPARATUS Filed Jan. 29, 1942  6 Sheets-Sheet 6

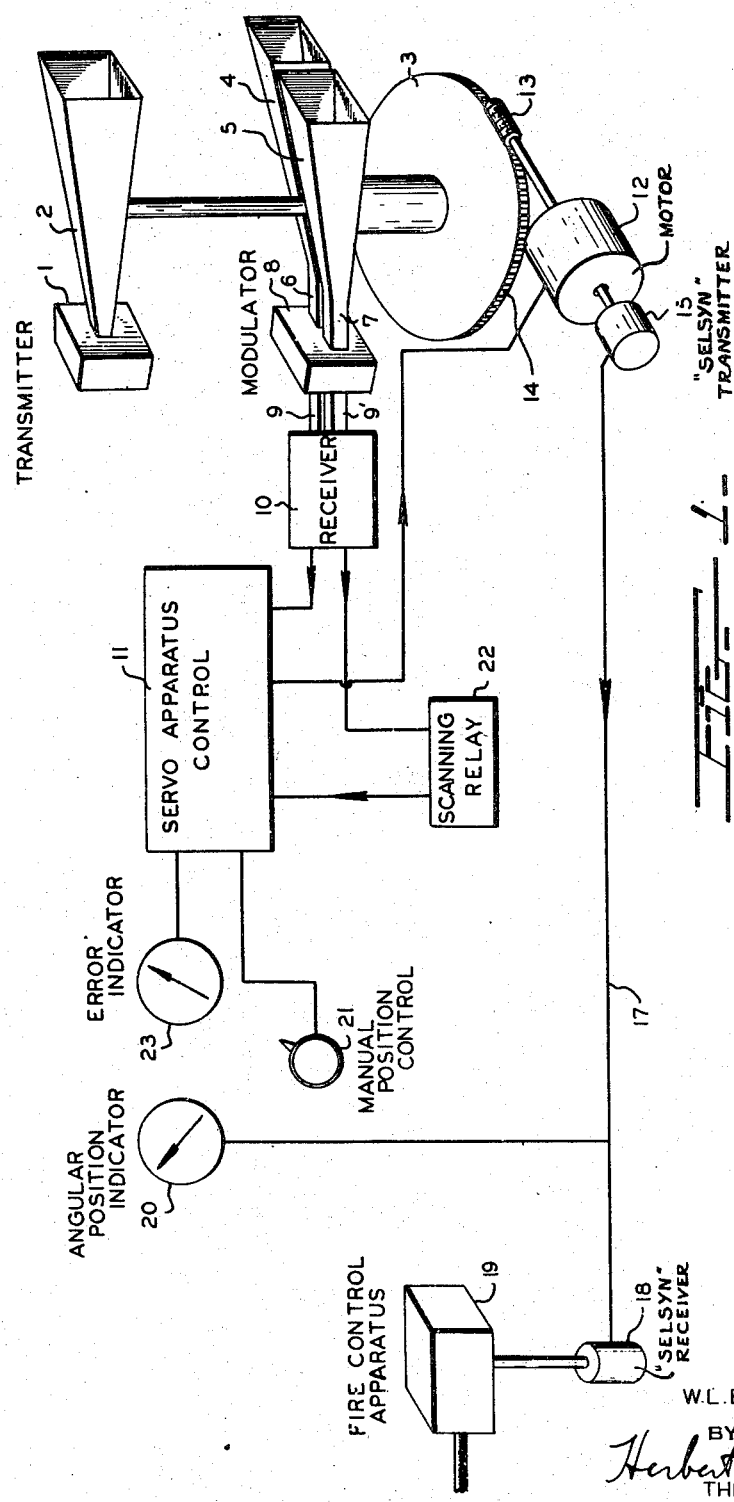

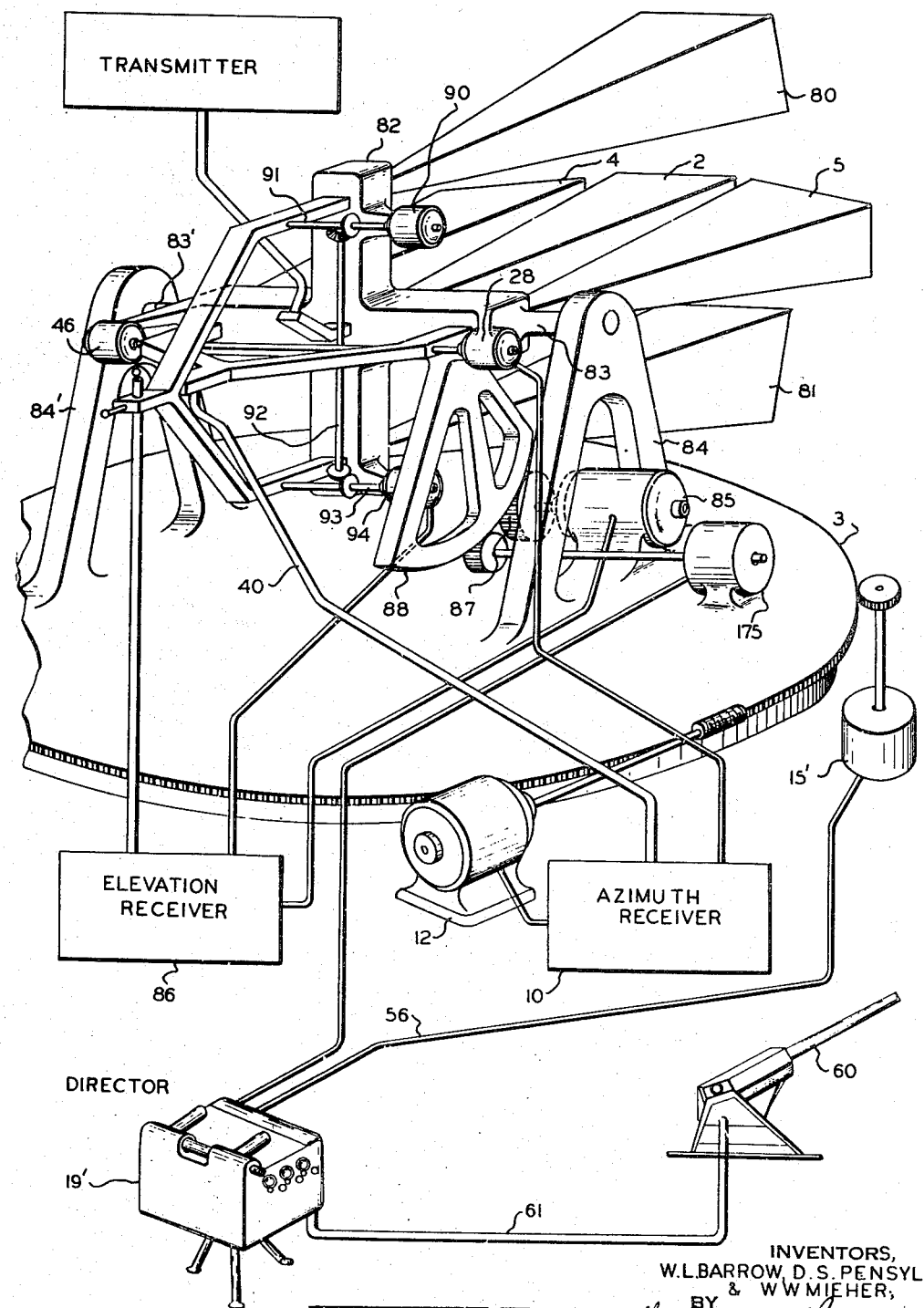

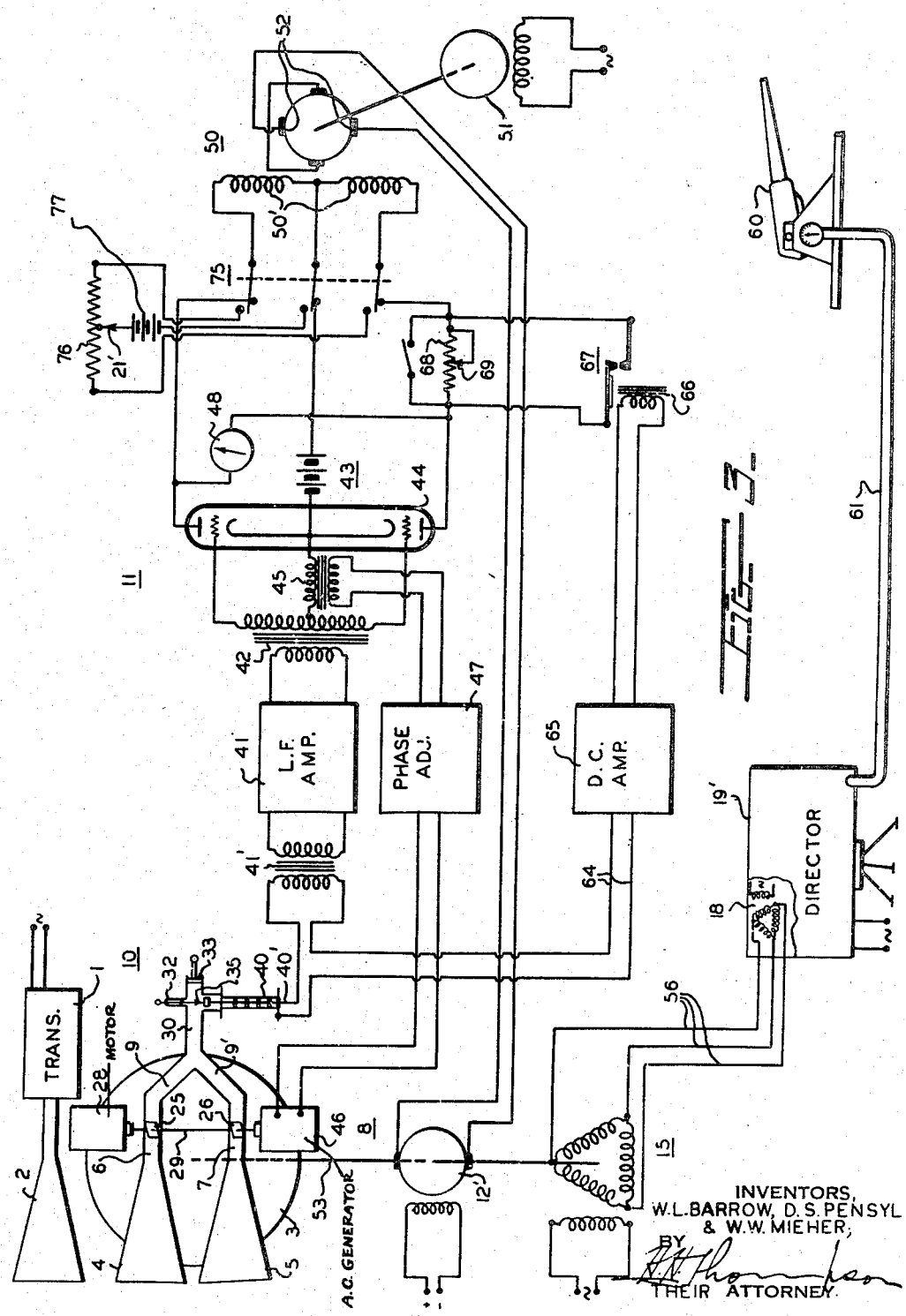

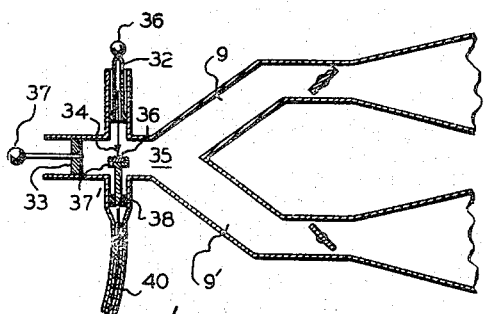
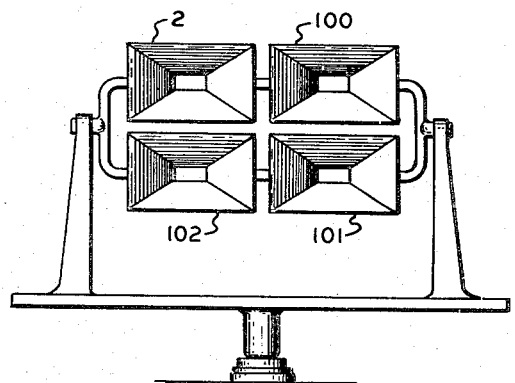
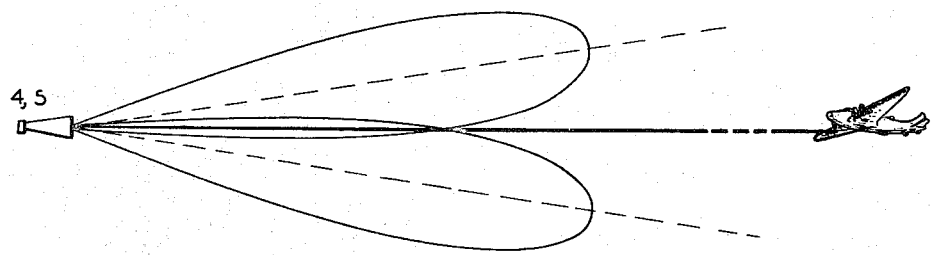
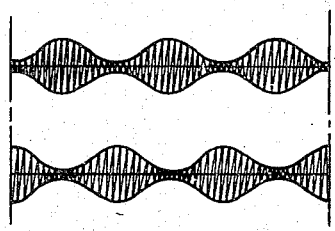
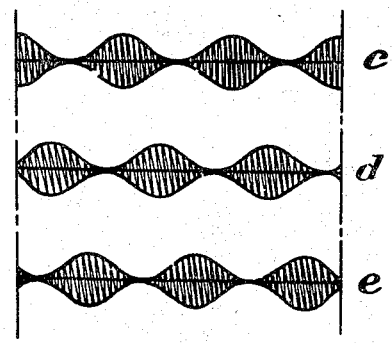
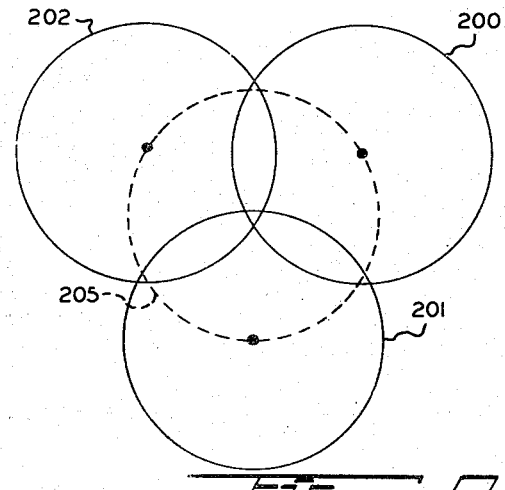
INVENTORS,
W. L. BARROW, D. S. PENSYL,
& W. W. MIEHER;

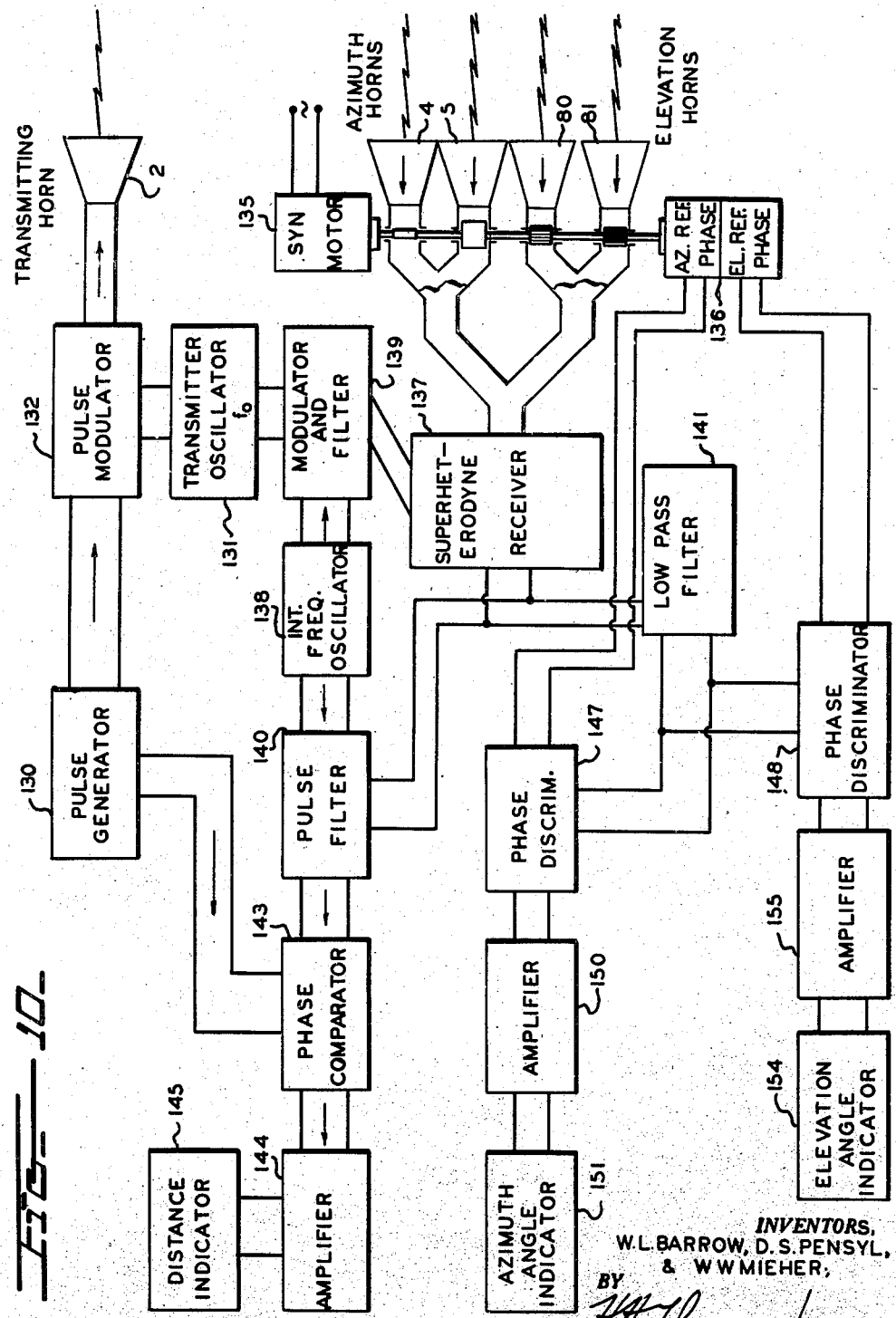

INVENTORS,
W. L. BARROW, D. S. PENSYL
& W. W. MIEHER;
BY
Herbert N. Thompson
THEIR ATTORNEY.

Patented Sept. 6, 1949

2,480,829

UNITED STATES PATENT OFFICE 2,480,829

RADIO DIRECTION INDICATING APPARATUS

Wilmer L. Barrow, Concord, Mass., and Daniel S. Pensyl, Great Neck, and Walter W. Mieher, Mineola, N. Y., assignors, by mesne assignments, to Research Corporation, New York, N. Y., a corporation of New York Application January 29, 1942, Serial No. 428,698

27 Claims. (Cl. 343—7)

This invention relates to apparatus for automatically indicating the direction and range of a target from an observation post, particularly the direction and range of a mobile aerial target, and it refers more specifically to a device of the above character which employs high frequency electromagnetic waves reflected from the target to actuate the indicating means.

The terms "target" and "target detection" are used herein to suggest application of the invention to military uses, such as directing gun fire against a target airplane, where, because of its extreme mobility, continuous and accurate information as to the direction and distance of the attacked plane is of vital importance for purposes of fire control. It will be obvious, however, that apparatus of the described character, furnishing distance and direction indications, may be put to many other uses, including the prevention of collisions between two aerial craft or between one such craft and a stationary obstacle, or in the instrument landing of aircraft. The term "target" therefore is intended to include any remote obstacle whose location is to be indicated.

To provide incident radiation on the target, according to our invention, we transmit a relatively narrow beam, preferably from the observation post, and cause the beam to search for the target either by manual or automatic means. Upon location of the target, the transmitted beam is thereafter automatically directed upon that object.

For reception of the reflected wave, according to one form of the invention, we employ in each of two dimensions, i. e., azimuth and elevation, two spaced, highly directional aerials or equivalent devices having their axes of maximum reception at a slight angle one to the other, and each having a directional receiving pattern which will be referred to as the "beam" received by that aerial. Each pair of aerials together with the apparatus to which it supplies energy constitutes a receiving channel furnishing impulses for indicating or control purposes.

To distinguish between reception over the two beams of a channel, for example the azimuth channel, the energy received from each beam is separately modulated, the two modulations occuring in distinctive phase relationship. Information is thus secured which permits the direction of the reflecting target to be indicated as will be further described. To secure range information, we provided means, which may be common in part with the directional means, for measuring the length of the path to and from the target in terms of phase shift of the transmitted and reflected wave. In addition to or in place of providing indications of target azimuth, elevation, and range the impulses or signals actuating the respective indicators may be used to control the actual orientation and setting of fire control or other devices.

One object of the invention is to provide a method and apparatus for indicating the direction of a mobile target by the reflection of electromagnetic waves from the target and the automatic orientation of an indicator in correspondence with the direction of reception of the reflected waves.

Another object is to provide in a system of the above character means for producing a plurality of overlapping beams of received electromagnetic energy and means for modulating the several beams at a common frequency but at relatively different phase angles.

A further object is to provide in combination with a direction indicating system of the above character a range indicating system utilizing elements in common therewith in which range indication is secured as the phase shift of a wave reflected from the target.

Another object is to provide a system of the above character in which transmitting and receiving aerials are automatically oriented relative to the direction of a target, without hunting.

Another object is to provide a system of the above character in which the directional properties of electromagnetic horns and parabolic reflectors are utilized to control the directional characteristics of the received beams.

A further object is to provide detection apparatus which automatically scans a field of view for a target and which ceases scanning and tracks the target automatically when that body is located.

Another object is to provide, in direction and distance indicating apparatus of the above character, circuit arrangements for synchronizing frequencies at the transmitter and receiver.

Still another object is to supply directional and range signals by means of apparatus of the above character which may be employed alternatively to supply indications of these quantities or to actuate servo mechanisms, for example, mechanisms controlling the aiming of a gun.

Other objects and advantages of this invention will become apparent as the description proceeds.

In the figures,

Fig. 1 is a schematic diagram of a system, according to the invention, for detecting and tracking a target in one dimension, for example, azimuth; and for furnishing target data to fire control apparatus.

Fig. 2 is principally a perspective view of a five-unit aerial assembly suitable for radiating a directional beam and for supplying inputs to both azimuth and elevation receiving channels, together with a schematic showing of associated apparatus.

Fig. 3 is a schematic wiring diagram of a system according to the invention, generally corresponding to that of Fig. 1.

Fig. 4 is an enlarged detail of Fig. 2.

Fig. 5 is a front elevation of a four-unit aerial assembly, comprising a transmitting and three receiving aerials.

Figs. 6, 7, 8 and 9 are diagrams for purposes of explanation.

Fig. 10 is a block diagram of a combined direction and range indicating system, according to the invention.

Figure 11:
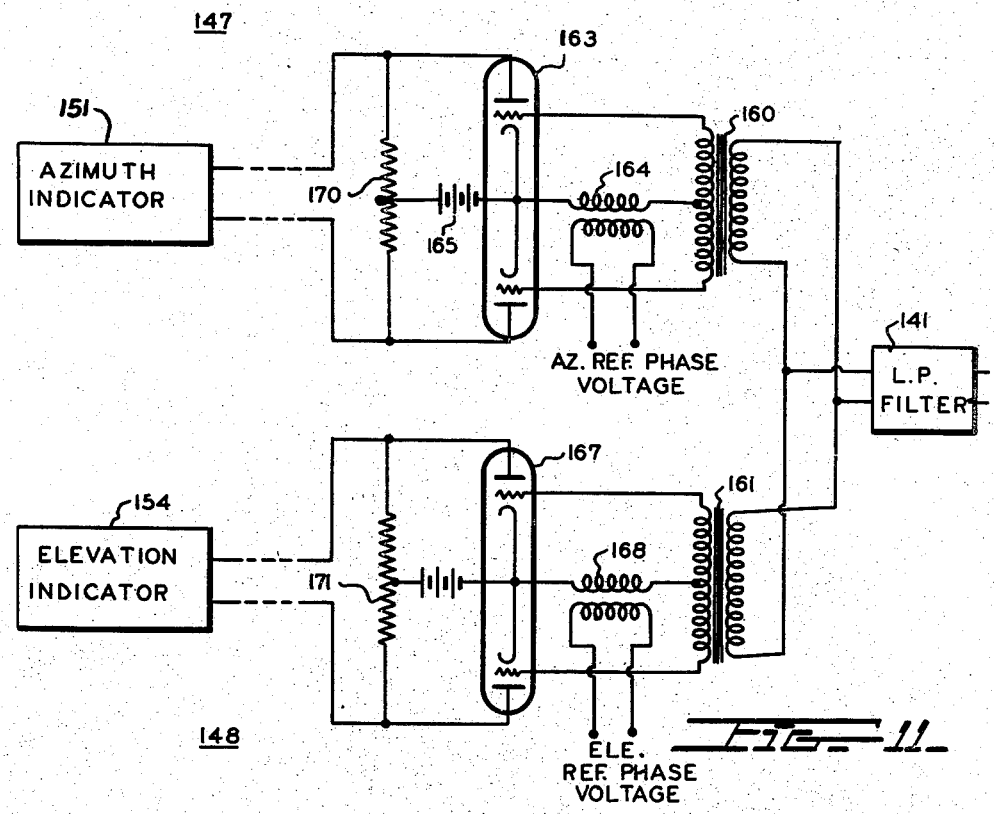
Fig. 11 is a schematic wiring diagram of a phase discriminating circuit.

Referring now to Fig. 1, there is shown schematically one channel, the azimuth channel, of a detection and tracking system embodying the principles of our invention. It is to be understood that the invention contemplates the provision of a channel similar in essential details to that of Fig. 1 for supplying elevation data and a third channel which may utilize elements in common with one or both of the aforementioned channels for supplying distance or range data. In certain modifications of the invention the azimuth and elevation channels may also have elements in common.

In Fig. 1, reference numeral 1 is applied to a radio transmitter of any suitable type which is coupled to a directional radiator or aerial 2 for radiating a directional beam of electromagnetic energy. The frequency at which transmitter 1 operates is preferably in the micro-wave or ultra high frequency range so that sharply directional beams of both transmitted and received energy may be secured with apparatus of moderate dimensions. Directional radiator or aerial 2 may take a variety of forms, including the conducting horn type here illustrated and which is described more particularly in an article by L. J. Chu and W. L. Barrow, the latter being one of the present inventors, in "Electrical Engineering" vol. 58, "Transactions" section, pages 333–338. Aerial 2 is supported from a rotatable platform or turntable 3 for rotation in azimuth. Likewise supported from turntable 3 are azimuth receiving aerials 4 and 5, here illustrated as conducting horns of a type similar to that of aerial 2. Horns 4 and 5 are shown as having rectangular cross sections and in this form the polarization of the transmitted and reflected wave is dependent upon the orientation of the rectangle. The long dimension of the cross section of horn 2 being horizontal, the corresponding dimensions of horns 4 and 5 are also horizontal. Horns 4 and 5 terminate in throats, having the form of similarly oriented hollow rectangular pipes 6 and 7 which serve as wave-transmission channels bounded by conducting material and connect with a modulator unit 8 where the waves received by the two horns are separately modulated at a low frequency as will be further described. The two modulated waves are then transmitted to a radio receiver 10 over transmission lines 9 and 9' of a type suitable for the frequencies involved. Detection or demodulation occurs in receiver 10 and the resulting output at modulation frequency, amplified if necessary, is supplied to servo apparatus 11 controlling the azimuth position of turntable 3. The driving means shown for rotating turntable 3 in a horizontal plane is a motor 12 having a shaft carrying a worm 13 meshing with teeth 14 cut on the periphery of turntable 3. A "Selsyn" transmitter 15 is driven by motor 12 in positional agreement with turntable 3 by a rigid connection to the motor shaft and transmits azimuth data over transmission line 17 to a "Selsyn" receiver 18 which reproduces the azimuth position of turntable 3, and of the units mounted thereon, at remotely located fire control apparatus 19 or furnishes an electrical signal proportional to this azimuth angle for controlling servo means in said fire control apparatus. The data transmitted over line 17 may, in addition to energizing receiver 18, be indicated at another location by an angular position indicator 20.

In operation the assembly of transmitter and receiver aerials carried by turntable 3 is positioned to direct the beam radiated by aerial 2 upon a target, for example an airplane. Initially, manual control means, indicated as actuated by position control knob 21, are used to cause the beam to search for the target while subsequently the transmitter beam is automatically and continuously kept on the target by means actuated by the received waves reflected from the target. This change from searching to tracking the target may be accomplished automatically by a relay 22, termed a scanning relay. Any angular error which occurs during tracking, whether by manual or automatic means, is shown by an error indicator 23, whose indication is thus a check on the functioning of the system.

The details of the receiving system will be more apparent from a consideration of the wiring diagram of Fig. 3 which, as in the case of Fig. 1, shows means for obtaining an indication in one dimension only. The modulating means forming a part of modulator 8 is shown in Fig. 3 as a pair of vanes 25 and 26 of conducting material in throats 6 and 7 of horns 4 and 5, respectively, which are simultaneously rotated and at the same rate by motor 28, by way of shaft 29. These vanes are of a suitable form and size to completely close the horn throats when positioned transversely of said throats. Horns 4 and 5 being of conducting material, when one or the other of conducting vanes 25 or 26 is in a position to close the throat of the horn in which it is located, transmission of electromagnetic energy to receiver 10 is substantially completely shut off, whereas when the vane is at 90° to this closed position substantially unimpeded transmission to the receiver takes place. It will be apparent therefore that by rotating the vanes and thus periodically changing their angular positions in the throats of the horns, modulation of the received waves which may approach 100 per cent takes place and, by adjusting the relative angular positions of the two vanes, modulation of the waves received independently by horns 4 and 5 may be caused to occur in any desired phase relationship. The phase relationship which we preferably employ is that in which a maximum of one wave occurs at the instant a minimum of the other wave occurs. This relationship is illustrated by the two modulated waves of Fig. 7 and is secured by setting vanes 25 and 26 at a 90° angle on shaft 29.

The waves passing the vanes are conducted by hollow pipe transmission lines 9 and 9' to a junction point with a pipe 30 where they combine. Pipe 30 has a longitudinal and a lateral extension each having a positionable closure in the form of a plunger, 32 and 33, respectively, of conducting material. These closures control the reflection of the transmitted wave within pipe 30 and its extensions and produce a condition of maximum voltage at the point at which detector 35, forming a part of receiver 10, is connected. An enlarged detail of this portion of the receiving apparatus is shown in Fig. 4 where it will more readily be seen that plungers 32 and 33 are adjustable by means of knobs 36 and 37 respectively and that detector 35, comprising contact member 34 and sensitive crystal 36 mounted in a holder 37', is supported by an insulating support 38 in a second lateral extension of pipe 30 forming a branched hollow pipe transmission line. The output of detector 35 is conducted to servo control apparatus 11 by way of coaxial cable 40 having an inner conductor 40' preferably connected to crystal holder 37' and a concentric outer conductor preferably connected to the wall of pipe 30, with which contact member 34 of detector 35 is also in electrical connection.

Referring again to Fig. 3, the detector output, which is an A. C. potential of a low frequency corresponding to the rate of modulation of the received radio frequency waves by the rotation of vanes 25 and 26, is supplied to a circuit including input transformer 41' of low frequency amplifier 41, which may be of conventional design. The output of amplifier 41, at modulation frequency, is passed by transformer 42 to phase-sensitive demodulator or rectifier 43, comprising rectifier tube 44 having a pair of triode elements connected in a balanced circuit. A. D. C. meter 48 is connected between the two plates of tube 44 to indicate unbalance between the outputs of the two sections of this tube. A voltage at modulation frequency to provide a reference phase for rectifier 43 is supplied to the grid circuit of tube 44, through transformer 45, from the output of generator 46 driven by shaft 29 in synchronism with vanes 25 and 26, generator 46 having a suitably excited field, not shown. A phase adjusting circuit 47, of a suitable known type, may be connected between generator 46 and transformer 45, for adjusting the phase of the reference voltage.

Rectifier 43 has a D. C. output which reverses in polarity in correspondence with input phase reversals and this output is supplied to the field windings 50' of D. C. amplifier 50, of the "amplidyne" type. The "amplidyne" amplifier is described more particularly in a series of articles in the "General Electric Review" for March 1940. A motor 51 is provided for driving the armature of the generator of device 50 at a constant speed and the amplified D. C. output potential across brushes 52, which reverses in polarity in correspondence with the input to fields 50', is applied to the armature of D. C. motor 12' (corresponding to motor 12 of Fig. 1) driving turntable 3 by way of shaft 53. Worm 13 and teeth 14 on the turntable are omitted in Fig. 3 for simplicity of illustration.

"Selsyn" transmitter 15, having a stator excited from a suitable A. C. source, has a rotor which is driven from shaft 53 and in which is induced an A. C. signal voltage corresponding to the azimuth angle of the platform 3. The signal voltages are transmitted over three-wire line 56 to director 19'. A description of a director suitable for anti-aircraft gun fire control and which is adapted to receive angular data from a "Selsyn" transmitter is to be found in U. S. Patent No. 2,065,303, issued to E. W. Chafee, H. Murtagh and S. G. Myers, December 22, 1936.

The angular data transmitted over line 56 are reproduced by "Selsyn" receiver 18 which may form a part of the director as indicated in Fig. 3, or may be mounted external thereto, as shown in Fig. 1. The azimuth angles thus received are set into the director either by manual or by automatic means and, as a result of the computations performed by the director, aiming angles are arrived at which are transmitted as signal voltages to gun 60 over cable 61 and there indicated in a suitable manner or utilized for automatically positioning the gun by means not forming part of the present invention and therefore not here shown.

In addition to the transmission of the output of detector 35 to input transformer 41', a series connection is also provided by line 64, to D. C. amplifier 65 of a suitable known type, which amplifies the D. C. component of this output. The amplified D. C. output of amplifier 65 is in turn applied to relay 66 having a contact 67, which is closed when the relay is excited. Closure of contact 67 short-circuits an adjustable resistance 68 in one half of the output circuit of rectifier 43. Resistance 68 is introduced into the otherwise balanced output circuit of rectifier 43 to unbalance the circuit to a degree determined by the position of adjustable contact 69 and thereby to cause a continuous rotation of motor 12' and a "searching" motion of the aerial assembly. The short-circuiting of resistance 68 by the operation of relay 66 restores the normally balanced condition of the rectifier output circuit which is then sensitive only to input potentials derived from the reflected wave. Meter 48 indicates unbalanced rectifier output resulting either from the inclusion of resistance 68 in the circuit or from the unequal reception of the reflected wave by horns 4 and 5.

The conducting path between tube 44 and "amplidyne" amplifier 50 is completed through three-pole, two-position switch 75. This is for the position of the switch shown in Fig. 3. In the alternative position of the switch the input to amplifier 50 is supplied by a potential divider circuit including a tapped resistance 76, the two parts of which, with the two fields 50' of the "amplidyne" generator, form a bridge arrangement excited by battery 77. Assuming equal resistance fields the bridge is balanced and equal and opposite currents are supplied to the two fields 50' when adjustable contact 21', which may be operated by position control knob 21 of Fig. 1, is at the center of resistance 76.

The operation of that part of the system described so far is as follows: A beam of high frequency energy is radiated by transmitter horn 2 and, assuming for the moment that the target location falls within the beam, a reflected wave travels back toward the observation post and is picked up independently by receiving horns 4 and 5. The two waves received by these horns are modulated by vanes 25 and 26 to obtain waves of the form and phase relationship illustrated by the upper and lower curves of Fig. 7. If the two modulated waves are of equal amplitude, which is the case when the target is in a position to reflect equal amounts of energy to the two horns, the result of their combination will be an unmodulated carrier wave. No wave of modulation frequency will then be supplied as an output of the receiving apparatus. Under this condition, no signal will be produced to cause motor 12' to turn turntable 3. This central location of the target which causes reflected waves of equal strength to be received by the two horns is illustrated in Fig. 6 where the equality of the two received waves will be apparent from the overlapping diagrams there shown of the directional reception of the two horns. Horns 4 and 5 being positioned at a very small angle are shown as coincident in this diagram. The upper directional pattern may, for illustration, be taken to be the characteristic of horn 4 and the lower one that of horn 5. If the target does not lie along the median line of the overlapping portion of the two similar received beams, the amplitude of the wave received by the one horn will be greater than that of the wave received by the other horn and consequently an unbalanced wave will reach detector 35 producing an output from the detector at modulation frequency having a phase determined by the phase of modulation of the stronger wave.

This low frequency output after being amplified, rectified and re-amplified as a D. C. potential in the receiving apparatus, supplies a voltage to the armature of motor 12' of the proper polarity to cause this motor to turn platform 3 in the proper direction to equalize the signals received by horns 4 and 5. It will be apparent therefore that the apparatus described is adapted to orient platform 3 automatically so as to maintain equal reception by the two receiving horns so long as reflected energy is received from the target and therefore constitutes means for automatically tracking the target during any space maneuvers which this object may perform. The azimuth angle of platform 3 (and of the aerial assembly mounted on the platform) is transmitted by "Selsyn" transmitter 15 to the director, and the corrected aiming angle computed by this device is transmitted to the gun for manual or automatic aiming purposes as has been previously described.

When the location of the target is not known at the beginning of operations, the aerial assembly mounted on platform 3 may be caused to scan a field including the probable target location, that is, to search for the target, by supplying to the driving means a signal which causes a slow continuous rotation of platform 3. This is done by positioning movable contact 69 (Fig. 3) to cause a suitable unbalanced D. C. output from rectifier 43 to be applied to the fields of "amplidyne" device 50 independently of that due to an input to rectifier 43. Under this condition the amplified output of device 50 is a voltage which may be of constant magnitude causing operation of motor 12' and resultant rotation of turntable 3. When the transmitted beam strikes a target, reflected energy is received by horns 4 and 5 and after demodulation by detector 35 the D. C. component of the detector output is supplied to amplifier 65. The amplified D. C. output of this amplifier causes actuation of relay 66 and the closing of contact 67, thus rebalancing the output circuit of rectifier 43 and stopping the scanning motion. Relay 66 will thereafter remain actuated so long as reflected energy is received from the target, the system then tracking the target automatically. We have thus provided means for causing our device to search automatically for a target by a scanning operation and immediately to track the target when the target location is determined, without any need for manual operations other than to initiate the scanning motion. Scanning patterns of various types may be had by suitably varying the position of contact 69, as for example sinusoidal scanning.

Automatic operation, only, has so far been described. We provide for manual in addition to automatic operation, permitting orientation of the aerial assembly in a desired direction at the start of operations or for test purposes. This feature is controlled by switch 75 and potentiometer resistance 76. With switch 75 thrown to its upper position and the radio receiver thereby disconnected from "amplidyne" device 50, the displacement of contact 21' of potentiometer 76 from its central position in one direction or the other causes an unbalanced current in a corresponding direction to flow in the fields 50' of device 50, producing operation of motor 12' and rotation of turntable 3 so long as contact 21' is thus displaced. Return of contact 21' to its normally central position stops the operation of motor 12' and the throwing of switch 75 to its lower position returns control of motor 12' to the radio receiver.

In the foregoing description of apparatus and method of operation the azimuth channel only has been referred to. As has been noted, the invention contemplates a similar grouping of apparatus, that is, another channel to furnish elevation data. The receiving horns, radio receiver and associated apparatus for the elevation channel may be duplicates of corresponding elements in the azimuth channel and consequently the elevation channel is not fully shown in the figures. Fig. 2, however, shows the manner in which an assembly of two azimuth and two elevation receiving horns and a transmitting horn may be mounted on a common support. The horns of each receiving pair, such as horns 4 and 5 of the azimuth channel and horns 80 and 81 of the elevation channel, are mounted at a slight angle one with the other in the plane in which their respective axes lie and preferably at an angle with the axis of transmitting horn 2, to produce the desired diversity of received beams. The position of transmitting horn 2 relative to the receiving horns is not particularly critical, the arrangement in Fig. 2 merely being an illustration of a symmetrical arrangement. The five horns are mounted on common support member 82, which is journalled in supporting brackets 84, 84', mounted on platform 3, by trunnions 83, 83'. It is to be understood that flexible connections or slip rings are provided for making connections between members on platform 3 and stationary members.

Elevation driving motor 85, corresponding to azimuth motor 12, which receives the output of elevation receiver 86, mounts on its shaft a pinion 87 meshing with a gear sector 88, forming an integral part of or rigidly attached to member 82, for rotating the complete aerial assembly in elevation about the axis of trunnions 83, 83'. Elevation modulation motor 90 drives a modulating vane in the throat of horn 80 by way of shaft 91 and a similar modulating vane in the throat of horn 81 by way of shaft 92, geared to shaft 91, and shaft 93 geared to shaft 92. Elevation reference phase generator 94 corresponding to azimuth generator 46 is also driven from shaft 93. The modulation of the elevation waves occurs preferably at the same frequency as that of the azimuth waves and the modulating vanes in the throats of the two horns 80 and 81 are set at 90° to one another as is the case of azimuth modulation. The relative phase of the elevation and azimuth modulations is preferably such that maximum and minimum amplitudes of the waves in one channel occur at instants halfway between the occurrence of corresponding maximum and minimum amplitudes of the waves in the other channel. This is accomplished by setting the vanes in the one channel at an angle of ±45 from the vanes of the other channel.

Our invention is not limited to the use of a pair of receiving horns for each channel, i. e., two azimuth and two elevation horns. Any number of horns greater than two can serve as the wave pick-up devices for a system indicating both azimuth and elevation angles. Fig. 5 illustrates an assembly of a transmitter horn 2 and three receiver horns 100, 101, and 102. While the four horns may be arranged in a square as shown, this is a matter of choice, it being only the orientation of the beam axes which is significant. The receiver horns are preferably positioned so that the axes of the three received beams are respectively parallel to equally spaced elements of the surface of a cone, whose axis may be, but is not necessarily, parallel to the axis of the transmitted beam. The axis of such a cone serves as a fixed line within the conical space defined by said beam axis, which fixed line is to be directed toward the target by horn-assembly positioning means. As an illustration of the relative positions of the received beams in such a system employing three receiving horns, Fig. 9 shows a section across the beams perpendicular to the axis of the cone on whose surface the beam axes lie. Intersecting circles 200, 201, 202, having centers on circle 205, represent sections of the three beams. It will be understood that the beams do not necessarily have the circular cross section shown for purposes of illustration in the figure. Furthermore, it will be apparent that the horns themselves do not necessarily occupy the same relative positions as do the receiving beams.

Figures 12, 13:
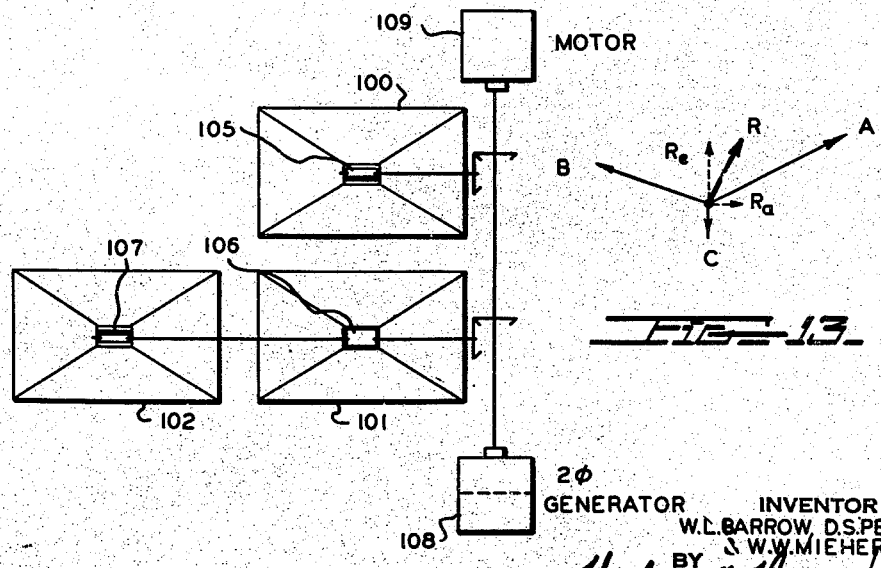
Fig. 12 is an elevation of the receiving aerials, only, of Fig. 5 showing modulating means.
Fig. 13 is a diagram for purposes of explanation.

Each of the three beams is modulated at a low frequency by suitable means such as the rotating vanes heretofore described. Fig. 12 shows the assembly of receiving horns, only, of Fig. 5 with the throats of horns 100, 101 and 102 in section. In this view modulating vanes 105, 106 and 107 are seen to be driven by shafting and gearing from motor 109. The vanes are set on their driving shafts at angles increasing progressively by 60° relative to the respective throat axes, that is, vane 106 is set 60° away from the angular position of vane 105 and vane 107 is set at 60°, in the same direction, from the position of vane 106, all vane positions being measured from the throat axes or other reference lines of the horns. Simultaneous rotation of the several vanes by motor 109 under these conditions produces modulation of the three received high frequency waves at the same low frequency but the modulation occurs at different phases as shown in Fig. 8 where the wave envelopes are seen as having progressively changing positions of maxima and minima.

Assuming that the upper curve $c$ represents the wave received by horn 100, as modulated by vane 105, and that the two lower curves $d$ and $e$ represent similar waves received by horns 101 and 102, as modulated by vanes 106 and 107, respectively, it will be seen that the interval between successive maxima of wave $c$ is divided into three equal parts by the next occurring maxima of waves $d$ and $e$, respectively. When waves $c$, $d$, and $e$ are demodulated there will result three waves at modulation frequency differing in phase by 120°, and the relative amplitudes of these waves will depend upon the orientation of the axes of horns 100, 101 and 102 relative to the direction of reception of the radio wave reflected from the target. This relationship is more clearly apparent in the vector diagram of Fig. 13 where vector A may, for example, represent the amplitude and relative phase angle of the low frequency wave resulting from the demodulation of carrier wave $c$ of Fig. 8, while vectors B and C, advanced respectively 120° and 240° ahead of vector A, may similarly represent the result of demodulation of waves $d$ and $e$, respectively, of Fig. 8. The resultant of vectors A, B and C, that is, the resultant of the combination of the three demodulated waves, is represented by the vector R which may be resolved along perpendicular axes whose angular positions are chosen to correspond to the phase angles of waves which would have been received by the elevation and azimuth horns of the previously described modifications of the invention. The resulting components, $R_e$ and $R_a$, are then proportional to the angle of target elevation and to the angle of target azimuth, respectively.

The demodulation of the waves received by way of horns 100, 101 and 102 may be accomplished in a suitable receiver corresponding to receiver 10 of Fig. 1 which may also serve as a combining means for the three waves. The output of such a receiver therefore will be a wave at modulation frequency represented as to amplitude and phase by the vector R of Fig. 13. The resolution of vector R into components $R_e$ and $R_a$ at 90° to one another may be accomplished with the aid of a two-phase generator 108 driven by motor 109 for supplying two modulation frequency voltages at 90° for reference phase purposes as might be done, also, by the employment of two generators similar to generator 46 of Fig. 3. The phase angles of the reference voltages are determined by the angular positions of the generator fields relative to the positions of vanes 105, 106 and 107. The means by which two such reference voltages may be used to resolve a composite voltage into components having a desired phase angle relationship is shown in Fig. 11 and will be described hereinafter in detail in connection with another modification of the invention.

To provide complete data for fire control purposes, a range indication must be furnished along with indications of azimuth and elevation angles. In one modification of our invention, we obtain an indication of range by making use of signals radiated and received by directional transmitting and receiving aerials, and modulated by modulating apparatus, which at the same time serves the azimuth and elevation channels. A unified three channel indicating system, including a range channel, is shown in schematic form in Fig. 10. In principle the range indication according to the arrangement of this figure is obtained by modulating the transmitted wave by a series of relative high frequency pulses and the comparison of the phase of the pulse series obtained by demodulation of the received wave with the phase of the transmitted pulse series to obtain a measure of the length of the path to and from the target, this distance being proportional to the measured phase shift.

Referring now to Fig. 10, there is shown a pulse generator 130 connected to modulate the output of transmitting oscillator 131 (corresponding to the transmitter 1 of Figs. 1 and 3) in a pulse modulator 132. Pulse generators are well known in the art where the pulse method of distance measurement has been widely employed to measure the height of the ionosphere. All pulse measurement systems require a high degree of frequency stability throughout the system. In the co-pending U. S. application of one of the present inventors, W. L. Barrow, Serial No. 405,466, filed August 5, 1941, now Patent No. 2,435,569, dated February 10, 1948, there is described a highly stable circuit, termed a "synchrodyne" circuit, a modification of which is incorporated in the range channel of the present invention to secure a desirable degree of stability therein. A more detailed description of the "synchrodyne" circuit than is given herein is to be found in the above mentioned application.

The pulse modulated wave radiated by aerial 2 is received, after reflection from the target, by azimuth horns 4 and 5 and elevation horns 80 and 81. A further modulation of the received waves at a frequency lower than the pulse frequency occurs, preferably by means previously described, i. e., by the rotation of modulating vanes in the throats of the receiving horns by one or more motors. In Fig. 10, for illustration, a single motor 135 is shown as driving the four modulating vanes in horns 4, 5 and 80, 81 of the azimuth and elevation channels. By the use of synchronous motors, however, it is possible to maintain synchronism between the rotation of the vanes of the two channels when driven by separate motors.

A two-phase generator 136 is driven by motor 135 in synchronism with the modulating vanes to supply two reference phase voltages at 90° which are employed to separate the azimuth and elevation channel outputs by making it possible to recognize the distinctive phases of their modulation. Obviously separate generators might be employed for this purpose.

The two waves received by horns 4 and 5, after modulation, are supplied to receiver 137 of the superheterodyne type. In place of the customary local oscillator this receiver is supplied with a heterodyning frequency derived from transmitting oscillator 131 by modulating the transmitter frequency with an intermediate frequency supplied by intermediate frequency oscillator 138. This modulation occurs in the circuit of modulator and filter 139 which also selects one of the resulting side frequencies (i. e., a sum or difference frequency) to serve as the heterodyning frequency in receiver 137. The combination of modulated carrier frequency derived from the waves received by the azimuth and elevation horns with the side frequency selected by modulator and filter 139 which occurs in receiver 137 results in a modulated intermediate frequency in the receiver which is independent of any frequency drift of transmitter oscillator 131 and also independent of the frequency characteristics of receiver 137, since only the frequency (pulse modulated) of oscillator 138 remains as a result of the interaction of frequencies just described. This portion of the circuit of Fig. 10 includes the "synchrodyne" feature of aforementioned application Ser. No. 405,466.

The output of receiver 137, which has a fundamental frequency corresponding to the rate of modulation produced by the rotation of the modulating vanes and which is modulated at pulse frequency is supplied to a parallel circuit including pulse filter 140 and low-pass filter 141. Pulse filter 140 passes the modulating pulses, which occur at a relatively high frequency, to phase comparator 143 which also receives recurrent pulses directly from generator 130. A number of types of phase comparators or phase difference indicators suitable for use in connection with our invention are known such as, for example, the one described in U. S. patent to Blancard, et al., No. 1,968,068 dated July 31, 1934.

The output of comparator 143 is a voltage proportional to the difference in phase between the waves received from pulse filter 140 and pulse generator 130, which phase difference represents the lag that has occurred during transmission of the wave to and from the target, and is therefore proportional to target distance or range. After amplification in a suitable amplifier 144 of a conventional type, this voltage is applied to control a distance or range indicator 145 which may take the form of a meter or any other suitable known indicator.

Returning to the output of receiver 137, low-pass filter 141 selects from this output frequencies lower than pulse frequency including the frequency at which the received waves are modulated by the vanes of the receiving horns. The output circuit of filter 141 includes a pair of phase discriminating circuits 147 and 148, which are supplied with voltages of reference phase from the two 90° spaced output phases of generator 136, respectively, or from two separate generators if preferred. It will be understood that phase adjusting circuits may be used in connection with the two outputs of this generator if necessary, as has previously been described in connection with the output of generator 46 (Fig. 3).

Circuit arrangements for phase recognition or phase discrimination are shown in Fig. 11. As shown in this figure the output of low-pass filter 141 is applied in parallel to similar phase sensitive circuits 147 and 148 through input transformers 160 and 161 respectively. Each discriminator, for example, 147 comprises a balanced demodulator tube such as tube 163 having a pair of triode elements or other suitable grouping of electrodes. The output of the azimuth reference phase section of generator 136 (Fig. 10) is applied to the two grids of balanced demodulator tube 163 in parallel by way of transformer 164 thereby providing these grids with an A. C. bias of the proper phase for selecting the azimuth signal component of the output of filter 141. Tube 163 is biased to give rectifying action. It may be biased to cut off to facilitate obtaining good rectification. D. C. biasing means (not shown) may be provided for this purpose.

The plate circuits of the tube are supplied with direct current from a suitable source such as battery 165. Since the output of filter 141 is applied through transformer 160 to the grids of tube 163 in push-pull relationship, a component of the signal having a phase corresponding to or in opposition to the bias supplied through transformer 164 will increase the peak potential on one grid and decrease that on the opposite grid, resulting in a flow of rectified current in one plate circuit or the other, dependent upon which of the opposite signal phases is applied to the grid, with a corresponding potential difference of one polarity or the other across the resistance 170. Thus, the reversible phase azimuth signal component of the output of filter 141 produces a reversible polarity potential across resistance 170 which may be utilized to actuate azimuth indicator 151 directly or through an amplifier 150 of the D. C. type as shown in Fig. 10.

Signal components having phases 90° away from whether of the azimuth signal phases will, if suitable circuit conditions are maintained, have no net effect on the output of tube 163. The circuit conditions just referred to imply that the grid potential-plate current characteristic of tube 163 shall have a substantially constant slope and a sharp cut off, and also, that the reference phase voltage applied through transformer 164 shall at all times be large in comparison with the signal input by way of transformer 160. Elevation components of the output of the filter 141 which are 90° away in phase from the azimuth components will produce an output from tube 167 in the form of a reversible polarity potential across resistance 171 in a manner similar to that described in connection with the operation of tube 163 under the influence of the azimuth signal. Elevation reference phase voltage, 90° away from the azimuth reference phase voltage, is supplied through transformer 168 and if the above mentioned circuit conditions are fulfilled, only the elevation signal component is effective in producing an output from tube 167.

A pair of phase discriminating circuits similar to those just described may be used to effect the resolution of the voltage represented by vector R of Fig. 13 into components $R_a$ and $R_e$. These discriminating circuits, as will be understood from the above description, will be supplied with two reference phase voltages at 90°.

The described arrangement of Fig. 10 provides means whereby a single radio wave pulse modulated at the transmitter and split into components by further modulation at the receiver is caused to actuate devices indicating azimuth, elevation and range simultaneously with the use of a single radio receiver.

In positioning the antenna assembly of Fig. 2, or similar assemblies used in other modifications of the invention, it will, in some instances, be desirable to provide means for suppressing or preventing hunting of the assembly about a position of equilibrium, such hunting being common when positioning bodies possess substantial inertia. For this purpose, we may employ means for supplying a signal to the driving motor which is proportional either to the velocity of the driven object or to the difference between the rate of change of the direction of the received wave relative to the antennae and the velocity of the driven object, in this case, the antenna assembly.

Suitable arrangements for providing such velocity signals are shown in the patent to Riggs, No. 2,115,086, issued April 26, 1938 and assigned to the assignee of the present invention. Other anti-hunting means employing auxiliary control terms proportional to the derivative or derivatives of the lag of the controlled object are described in Patent No. 2,257,757, for Radio Compass Navigation Apparatus, issued October 7, 1941 to F. L. Moseley, also assigned to the same assignee as is the present application.

While the target locator of the present invention has been described principally as being actuated by a radio wave reflected from a target, it will readily be understood that so far as directional indication is concerned, radiation of a wave by the target may be made use of, no distinction being made at the received apparatus between waves transmitted from the target directly or by reflection.

Also, while the description has principally mentioned radiating and receiving devices of the electromagnetic horn type, a wide range of equivalent directional devices may be used within the scope of the invention to direct radiation on the target and to receive energy reflected thereby such as antenna arrays, parabolic and other conducting reflectors. The manner in which such elements may be substituted for the horn type devices illustrated and described will readily be appreciated by those skilled in the art.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. In a radio actuated target locator, in combination, means for receiving a radio wave transmitted from a target including a plurality of directional receiving antennae having overlapping directional receiving patterns, means for orienting the receiving pattern of at least one of said antennae relative to the direction of reception of said wave, mechanical means for producing a distinctive modulation of the output of each of said antennae, a radio receiver receiving a combination of said several modulated antennae outputs and including means for demodulating the combination whereby the receiver has a low frequency wave output having a phase determined by said combination, means for converting said low frequency wave into a quantity varying smoothly in magnitude and sense with the magnitude and phase of said low frequency wave, and means for controlling said orienting means by said quantity.

2. In combination, a radio transmitter, means actuated thereby for radiating a wave in a selected direction, first means for modulating said wave, a reflecting object, a plurality of directional receiving devices receiving said wave after reflection by said object, second means modulating the respective outputs of said devices at a common frequency but in different phase relationship, a common demodulator for said outputs, selective means for separating from the output of said demodulator components respectively corresponding to the modulations produced by said first and said second means, and individual means controlled respectively by said components.

3. A target location indicator furnishing simultaneous directional and range indications comprising: a radio transmitter including means for generating a radio wave and selectively radiating said wave in the direction of the target and means for modulating said wave at a first modulating frequency including a generator of said frequency; a plurality of directional receiving devices positionable to receive said wave after reflection from the target, said devices being arranged to have overlapping non-coincident directional receiving patterns; means for modulating the output of each of said devices at a second modulating frequency, modulation of the several outputs at said second frequency occurring in relatively different phase relationship; means combining said several modulated outputs; a radio receiver receiving the combination thereof and supplying a complex low frequency wave which is the resultant of components of different characteristics corresponding respectively to the modulations of said several outputs; means for selecting from said last wave components at each of said two modulating frequencies; means sensitive to the phase and magnitude of said one component at said second modulating frequency for providing an indication of the direction of the target; and means sensitive to the phase of said other component at said first modulating frequency for indicating range, said last phase being measured relative to the phase of the output of the generator of said first modulating frequency.

4. A target location indicator furnishing simultaneous direction and range indications through the medium of a radio wave transmitted to and reflected from a target comprising; a radio transmitter including a directional radiator adjustable for radiating a wave in the direction of the target, a pulse generator supplying recurrent pulses at a predetermined rate, and means for modulating the wave radiated by said transmitter in accordance with said pulses; a plurality of directional receiving devices, said devices being oriented to have overlapping directional patterns with their respective axes of maximum reception at fixed small angles one to the other; means for impressing modulation at the same frequency but of relatively different phase on the output of each of said devices; common demodulating means for deriving from a combination of said last named modulated waves a complex low frequency wave; means including a filter for deriving from said low frequency wave a component corresponding to the pulse modulation thereof; means measuring the difference between the phase of said derived pulse wave and the phase of said generated pulses; a range indicator actuated in accordance with said difference; means for further deriving from said low frequency wave a wave independent of said pulses; a source of reference phase voltage; and phase sensitive indicator means biased by said reference phase voltage and actuated in accordance with the phase and amplitude of said last wave to provide a directional indication.

5. In a radio actuated target directional indicator, a pair of directional antennae each having a directional receiving pattern in the form of a beam with an axis of maximum reception, a support mounting said antennae with said axes at a small fixed angle one to the other and with said beams overlapping, means modulating the outputs of said two antennae at the same frequency but in different phase relationship, a source of reference phase voltage, a radio receiver jointly receiving said two outputs for obtaining a low frequency signal having an amplitude and phase jointly dependent upon said two outputs, phase sensitive means, receiving said reference phase voltage and controlled by said signal for generating a voltage varying progressively in magnitude and sense with variations in relationship between said reference phase voltage and said signal, and motive means responsive to said generated voltage for positioning said support smoothly in a null position as determined by said generated voltage.

6. In a radio actuated target directional indicator, a positionable support, a radio transmitter including a directional radiator mounted on said support, said radiator having an axis of maximum radiation, a pair of directional receiving devices also mounted on said support, said devices having receiving patterns in the form of non-coincident overlapping beams with the axes of maximum reception thereof oriented in the general direction of said radiation axis, means for modulating the outputs of said receiving devices at the same frequency but in different phase relationship, means for combining said outputs and subsequently demodulating said combination, a source of reference phase voltage, phase sensitive means receiving the output of said demodulator and biased by said source of supplying a signal varying in magnitude and sense with variation in the relationship between said demodulator output and said source of phase reference voltage, and motive means for positioning said support responsive to said signal, said signal exercising opposite control on opposite sides of a null position of said support defined by equal reception by said two receiving devices.

7. In a system for indicating the direction of a reflecting object from an observation post, a radio transmitter including a radiator suitable for directing a beam of electromagnetic energy upon said object, a positionable support, a pair of electromagnetic horns of conducting material mounted on said support with their axes at a small angle one to the other, electro-mechanical means for independently modulating and in relative different phase relationship electromagnetic energy received by each horn, said energy normally being received by reflection of said beam by said object, a radio receiver receiving a combination of the modulated outputs of said horns and supplying a low frequency signal wave, said signal wave being of reversible phase dependent upon the relative magnitude of said two outputs, and positioning means for said support reversibly controlled by said wave.

8. The combination as claimed in claim 7, in which said electro-mechanical modulating means comprises a rotatable vane of conducting material associated with each horn in a suitable manner for obstructing the passage of electromagnetic waves through said horn at one angular position of said vane and allowing substantially unimpeded transmission of waves through said horn at another angular position of said vane, and means rotating said vanes for causing each to periodically pass through said two positions.

9. The combination claimed in claim 7, in which electro-mechanical means are utilized capable of producing substantially 100 per cent modulation of the waves received by said two horns.

10. In a system for supplying angular indications in two dimensions of the direction of reception of an electromagnetic wave, an assembly of a number of receiving antennae greater than two each having a directional receiving pattern substantially symmetrical about an axis of maximum reception, said axes having directions respectively parallel to equally spaced elements of the surface of a cone, and means for positioning said assembly to cause a line at equal angles with said axes to coincide with the direction of reception of said wave including means for modulating the outputs of said several antennae at a common frequency but in relatively different phase relationships, a common receiver receiving said several modulated outputs and supplying a low frequency wave of variable amplitude and variable phase dependent upon the relative amplitudes of said several modulated antennae outputs, means for resolving said variable phase wave into two reversible phase components in ninety degree phase relationship, and individual means respectively responsive to said two components for displacing said assembly in two mutually perpendicular planes.

11. In a system for supplying angular indications in two dimensions of the direction of reception of an electromagnetic wave, an assembly of a number of receiving antennae greater than two, each having a directional receiving pattern substantially symmetrical about an axis of maximum reception, said axes diverging, and means for positioning said assembly to cause a fixed line within space defined by said axes to coincide with the direction of reception of said wave, including means for modulating outputs of said several antennae at a common frequency but relatively different phase relationship, a common receiver receiving said several modulated outputs and supplying a low frequency wave of variable amplitude and variable phase dependent upon the relative amplitudes of said several modulated antennae outputs, and means responsive to variations in said low frequency wave for producing a quantity varying in magnitude therewith to indicate direction from which such a wave is received.

12. An automatically oriented antenna array comprising a positionable support, a direct current motor connected for positioning said support, a pair of receiving antennae mounted on said support to have overlapping, non-coincident directional receiving patterns, means modulating the outputs of said antennae at a common frequency but in relatively different phase relationship, a radio receiver jointly receiving said modulated outputs as an input and supplying a reversible phase low frequency output in response thereto, means for converting said last output into a reversible polarity potential varying smoothly with variations in phase and magnitude of said low frequency output, and means responsive to said potential for controlling said motor.

13. Target locating apparatus comprising a radio transmitter, a directional radiator supplied thereby, a positionable receiving antenna array normally receiving a wave radiated by said radiator after reflection from a target, means controlled by the combined output of said array for normally positioning said array in a direction corresponding to the direction of reception of said wave, and means for modifying the operation of said positioning means to cause scanning of a predetermined field by said array.

14. Target locating apparatus comprising a radio transmitter including a radiator supplied thereby, a rotatable support, differentially directional receiving means mounted on said support for receiving radiation from said radiator after reflection from a target and supplying a reversible signal dependent upon the orientation of said support relative to the direction of reception of said radiation, reversible motive means normally controlled by said signal for rotating said support to a null position, and means modifying the control of said motive means to cause continuous operation thereof in one direction.

15. Target locating apparatus comprising self-orienting directional radio receiving means including an orienting motor and normal means controlling said motor in accordance with the direction of reception of a radio wave, auxiliary means for controlling said motor in the absence of radio reception, and means responsive to radio frequency energy for shifting control from said auxiliary means to said normal means upon reception of a radio wave.

16. Target locating apparatus comprising a radio transmitter, a directional radiator supplied thereby for directing radio frequency energy toward a target, self-orienting differentially directional receiving means responsive to reflected radio frequency energy and including a pair of electro-magnetic horns at a small angle to each other, a radio receiver coupled thereto differentially responsive to said horns to produce an output signal and an orienting motor reversibly controlled by a signal supplied by said means upon reception of a radio wave for normally orienting said receiving means in the direction of a wave received from said transmitter after reflection from a target, and means indicating the deviation of the position of said receiving means from the direction of reception of said wave.

17. Apparatus for automatically supplying target azimuth and elevation data to gun fire control equipment comprising a radio transmitter including a directional radiator, means for receiving a wave radiated by said radiator after reflection from a target including a pair of azimuth directional receiving devices having their respective axes of maximum reception at a small horizontal angle to one another, a pair of elevation directional receiving devices having their respective axes of maximum reception at a small vertical angle to one another, adjustable means modulating the outputs of all said receiving devices at a common frequency, said means being adjusted to oppositely modulate the respective outputs of each pair of said devices with said opposite modulations occurring at different phase angles in said azimuth and elevation devices, a source of said common frequency having an output at the phase of the modulation of one of said azimuth devices, a source of said common frequency having an output at the phase of the modulation of one of said elevation devices, means combining and jointly demodulating the outputs of all said devices, a pair of phase sensitive means respectively biased by said sources for supplying two reversible signals respectively dependent upon the orientation of said azimuth devices and said elevation devices relative to the received wave, individual means for positioning said two pairs of devices in the planes of their respective indications, means for controlling each of said positioning means in accordance with said signal corresponding thereto, and target azimuth and elevation indicating means positioned synchronously with said two positioning means respectively.

18. Apparatus for locating a target in azimuth and elevation comprising a radio transmitter including a directional radiator, means for receiving a wave radiated by said radiator after reflection from a target, including a pair of azimuth directional receiving devices having overlapping patterns with their respective axes of maximum reception at a horizontal angle to each other, a pair of elevation directional receiving devices having overlapping receptive patterns with overlapping axes of maximum reception at a vertical angle to each other, means for modulating the outputs of all of said receiving devices at a common frequency, a source of such common frequency, said modulating means being arranged for successively different phase relationships of modulation with respect to the output of said source of common frequency, means combining and jointly demodulating the outputs of all of said devices, a first phase sensitive means biased in fixed relation to said common frequency source for producing a quantity variable in response to variations in output modulations of said azimuth receiving devices, a second phase sensitive means biased in a different relation to said common frequency source for producing a quantity variable in response to variations in output modulations of said elevation receiving devices, whereby said phase sensitive means provide response dependent upon orientation of said receiving devices with respect to the received wave and therefore indicative thereof.

19. In radio receiving apparatus, a pair of electromagnetic horns having their axes at a small angle one with the other and having overlapping directional receiving patterns, a rotatable conducting vane in the throat of each horn, said two vanes being set at an angle one to the other, means for continuously rotating said vanes to modulate thereby waves received by said horns, means for synchronously rotating an alternating current generator to obtain a reference phase voltage at modulation frequency, and means responsive to the relation of modulation of waves received by said horns to said reference phase voltage for producing a quantity dependent in magnitude and sense upon said relation and indicative of angular relationship between said horns and the direction from which such waves are received.

20. In radio receiving apparatus, a pair of electromagnetic horns having their axes at a small angle one with the other and with overlapping directional receiving patterns, a rotatable conducting vane in the throat of each horn, two vanes being set at a 90° angle one to the other, means for continuously rotating said vanes to distinctively modulate the outputs of said horns resulting from incidence of a single radio wave thereupon, a source of modulation frequency, phase sensitive means biased by said source and receiving a combination of the outputs of said horns, and an indicator controlled by the output of said last means.

21. In radio receiving apparatus, a pair of radio wave reception devices having directional receiving patterns which overlap, a pair of wave transmission channels each coupled to one of said reception devices, each channel including a section in the form of a hollow pipe, a rotatable conducting vane mounted in each of said pipes, said two vanes being set at an angle one to the other, means for continuously rotating said vanes to modulate waves received by said devices, and means responsive to relationship between modulated received waves for producing a quantity varying in magnitude therewith to indicate direction from which radio waves are received.

22. A radio actuated target locator comprising a radio transmitter, means for modulating the output of said transmitter at a pulse frequency including a pulse generator, a reflecting target, a plurality of differentially directive receiving devices receiving a wave reflected from said target, means distinctively modulating the outputs of each of said receiving devices at a common frequency, a common receiver including combining means for demodulating the combined modulated output of said devices, said receiver being of the superheterodyne type, means for modulating a voltage derived from said transmitter at an intermediate frequency, selective means for supplying a side frequency of said last modulation to said receiver as a heterodyning frequency, means for separating components of the output of said receiver at said pulse frequency and said other modulating frequency respectively, and individual means controlled in accordance with said two components.

23. In high frequency radio apparatus a wave transmission channel in the form of a hollow pipe with connections for interposition between means for supplying a high frequency radio energy input and means responsive to modulated radio energy, a rotatable vane mounted within said pipe, and means for rotating the vane at a predetermined speed to modulate radio energy passing through the pipe at a frequency corresponding to rotation speed.

24. In high frequency radio apparatus, a wave transmission channel in the form of a hollow pipe with connections for interposition between means for supplying a high frequency radio energy input and means responsive to modulated radio energy, a rotatable vane mounted within said pipe, means for rotating the vane at a predetermined speed to modulate radio energy passing through the pipe, and means for recovering such modulations to produce a signal having a frequency corresponding to said rotation speed.

25. In combination, a radio transmitter, radio receiving means, antenna means coupled to said transmitter and said receiving means for radiating energy from said transmitter to a distant object and intercepting and supplying to said receiving means energy reflected from said distant object, said antenna means including a plurality of divergently aimed directive antennas, and said receiving means being connected in circuit therewith, means associated with said directive antennas for simultaneously modulating the energies received thereby respectively in relatively distinctive manners and for supplying the received energies so modulated simultaneously to said receiving means, and differential demodulating means connected with said receiving means for discriminating between the relatively distinct modulated received energies to produce a differential signal voltage output dependent upon the difference in magnitude of the distinctively modulated energies.

26. In combination, a radio transmitter, radio receiving means, antenna means coupled to said transmitter and said receiving means for radiating energy from said transmitter to a distant object and intercepting and supplying to said receiving means energy reflected from said distant object, said antenna means including a plurality of divergently aimed directive antennas, means associated with the directive antennas for modulating the energies supplied thereto respectively in relatively distinctive manners, means for generating a reference voltage having a variation corresponding to the modulation variation, and a differential demodulator connected with said receiving means and energized by said reference voltage for discriminating between the relatively distinct modulated energies to produce a differential signal voltage output dependent upon the difference in magnitude of the distinctively modulated energies.

27. In combination, a radio transmitter, radio receiving means, antenna means coupled to said transmitter and said receiving means for radiating energy from said transmitter to a distant object and intercepting and supplying to said receiving means energy reflected from said distant object, said antenna means including a plurality of divergently aimed directive antennas, and said receiving means being connected in circuit therewith, means associated with said directive antennas for simultaneously modulating the energies received thereby respectively in relatively distinctive manners and for supplying the received energies so modulated simultaneously to said receiving means, means for generating a reference voltage having a variation corresponding to the modulation variation, and a differential demodulator connected with said receiving means and energized by said reference voltage for discriminating between the relatively distinct modulated energies to produce a differential signal voltage output dependent upon the difference in magnitude of the distinctively modulated energies.

WILMER L. BARROW.
DANIEL S. PENSYL.
WALTER W. MIEHER.

REFERENCES CITED

The following references are of record in the file of this patent:

UNITED STATES PATENTS

| Number | Name | Date |
|---|---|---|
| 1,844,859 | Levy | Feb. 9, 1932 |
| 1,862,119 | Little | June 7, 1932 |
| 1,961,598 | Scheppmann | June 5, 1934 |
| 2,063,534 | Wallace | Dec. 8, 1936 |
| 2,156,297 | Kruesi | May 2, 1939 |
| 2,176,469 | Moueix | Oct. 17, 1939 |
| 2,206,683 | Wolff | July 2, 1940 |
| 2,206,923 | Southworth | July 9, 1940 |
| 2,208,378 | Luck | July 16, 1940 |
| 2,231,929 | Lyman | Feb. 18, 1941 |
| 2,235,826 | Chaffee | Mar. 25, 1941 |
| 2,238,129 | Paul | Apr. 15, 1941 |
| 2,254,943 | Galle | Sept. 2, 1941 |
| 2,257,319 | Williams | Sept. 30, 1941 |
| 2,257,757 | Moseley | Oct. 7, 1941 |
| 2,277,464 | Taylor | Mar. 24, 1942 |
| 2,396,044 | Fox | Mar. 5, 1946 |
| 2,410,657 | Hershberger | Nov. 5, 1946 |
| 2,412,702 | Wolff | Dec. 17, 1946 |
| 2,424,193 | Rost et al. | July 15, 1947 |

FOREIGN PATENTS

| Number | Country | Date |
|---|---|---|
| 550,515 | Germany | May 18, 1932 |
| 526,658 | Great Britain | Sept. 23, 1940 |

OTHER REFERENCES

"Electronics," page 76, March, 1943.